(12) United States Patent
Dehrmann et al.

(10) Patent No.: US 11,402,031 B2
(45) Date of Patent: Aug. 2, 2022

(54) EXPANSION VALVE

(71) Applicant: ECO Holding 1 GmbH, Marktheidenfeld (DE)

(72) Inventors: Sven Dehrmann, Woerth am Rhein (DE); Adrian Eslava Orradre, Stuttgart (DE); Daniel Reimann, Baltmannsweiler (DE); Toni Schneider, Esslingen (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 17/103,022

(22) Filed: Nov. 24, 2020

(65) Prior Publication Data

US 2021/0172541 A1 Jun. 10, 2021

(30) Foreign Application Priority Data

Dec. 4, 2019 (DE) .......................... 102019132979.5
Sep. 24, 2020 (DE) .......................... 102020124870.9

(51) Int. Cl.
*F16K 31/04* (2006.01)
*F16K 31/50* (2006.01)
*F25B 41/35* (2021.01)

(52) U.S. Cl.
CPC .............. *F16K 31/04* (2013.01); *F16K 31/50* (2013.01); *F25B 41/35* (2021.01)

(58) Field of Classification Search
CPC ..................................................... F25B 41/35
USPC ........................................ 251/129.11, 129.12
See application file for complete search history.

(56) References Cited

U.S. PATENT DOCUMENTS

| 5,083,745 A * | 1/1992 | Tischer ................... F16K 31/04 |
| | | 251/129.11 |
| 7,758,013 B2 * | 7/2010 | Arai ........................ F16K 31/53 |
| | | 251/85 |
| 2006/0261302 A1 * | 11/2006 | Inoue ........................ F16K 1/04 |
| | | 251/129.11 |
| 2007/0240690 A1 * | 10/2007 | Nanba .................... F02M 26/11 |
| | | 123/568.18 |
| 2014/0234152 A1 * | 8/2014 | Ito ............................. B22F 3/10 |
| | | 419/11 |
| 2019/0178404 A1 * | 6/2019 | Zhang ..................... F16K 31/04 |
| 2020/0240539 A1 * | 7/2020 | Lan ........................ F16K 27/102 |
| 2020/0292094 A1 * | 9/2020 | Arai .......................... F16K 1/32 |
| 2020/0386340 A1 * | 12/2020 | Lv ........................... F16H 57/08 |

FOREIGN PATENT DOCUMENTS

JP 3328530 B2 9/2002

* cited by examiner

*Primary Examiner* — Robert K Arundale
(74) *Attorney, Agent, or Firm* — Von Rohrscheidt Patents

(57) ABSTRACT

An expansion valve operable by a stepper motor, the expansion valve including a housing; a hollow shaft arranged in the housing; a valve base that supports the hollow shaft and closes the housing; a rotor drivable by a stator of the stepper motor; a center spool arranged in the hollow shaft and drivable by the rotor so that a rotation of the center spool is transferrable by a threaded connection into an axial movement of the center spool that opens or closes the expansion valve; and a sleeve that includes a receiving portion that includes at least portions of the center spool, of a compression spring and of a force transmission element respectively and a valve needle, wherein the receiving portion of the sleeve element is closed by a bushing.

17 Claims, 7 Drawing Sheets

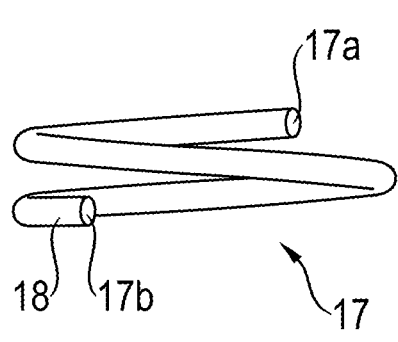
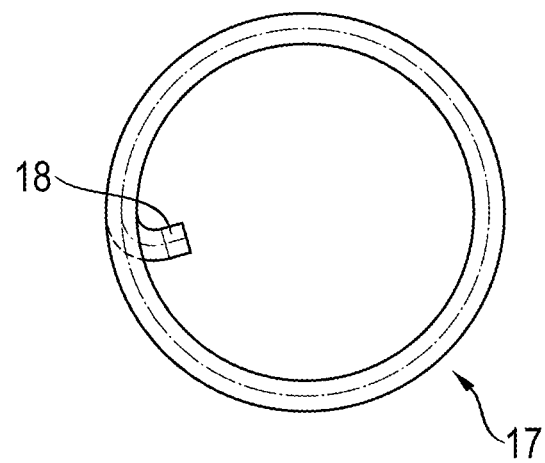
FIG. 6          FIG. 7
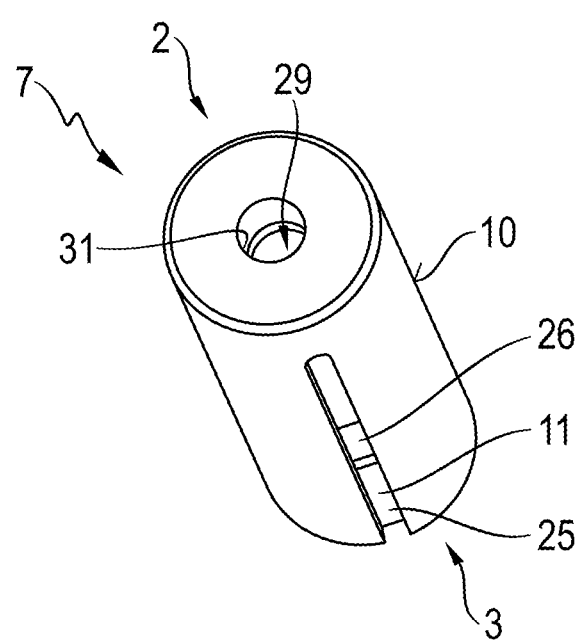
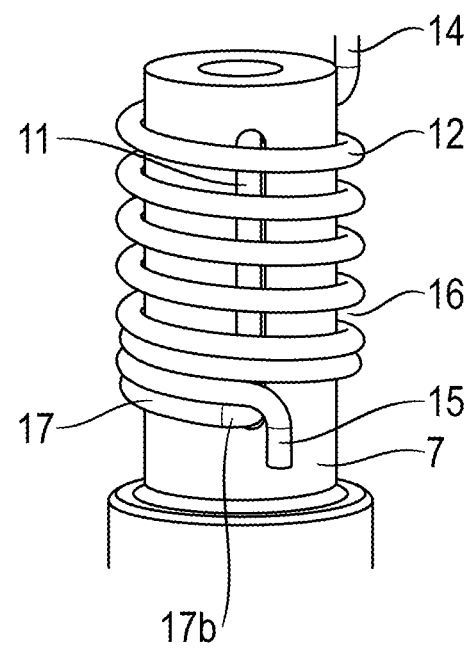
FIG. 8          FIG. 9

EXPANSION VALVE

RELATED APPLICATIONS

This application claims priority from and incorporates by reference German patent applications DE 10 2019 132 979.5 filed on Dec. 4, 2019; and DE 10 2020 124 870.9 filed on Sep. 24, 2020.

FIELD OF THE INVENTION

The invention relates to an expansion valve.

BACKGROUND OF THE INVENTION

Expansion valves also designated as throttle valves are devices in general that reduce a pressure of a fluid by running the fluid through a locally constricted flow cross section to cause a volume increase or expansion. Typically, expansion valves include a mechanism that transposes a rotating movement into an axial movement for opening and dosing the expansion valve. Axial movements for opening and dosing the expansion valve require a delimitation or a defining of two end points using a stop structure.

Expansion valves of his type are well known in the art. JP 3328530 B2 discloses a stopper structure for a powered valve. In this valve a percentage of opening of a valve seat in a main valve body is controlled by rotating a rotor of a motor by running electricity through a stator of the motor. The stator is attached at the outer circumference of the housing. Threading an inner thread in an outer thread transposes the rotation of the rotor into a linear movement.

The stopper structure that is configured to define the two end points when opening and dosing the expansion valve includes a stopper, an engagement element and an annular support pin.

The stopper is vertically arranged at a location that is distal from the center at a backside of a cover at an upper end portion of the housing.

The engagement component includes a long narrow shaft which extends at an opposite side of a valve shaft that is integrally configured with the rotor. Thus, the shaft is inserted into a support path with a helical center portion and protruding portions at a top end and a bottom end, wherein the upper protruding portion is arranged at an upper end portion of the shaft and wherein the upper protruding portion is bent upward.

The stopper structure additionally includes an annular support pin that includes an annular portion that is wound approximately once about the helical center portion and that includes an arm that extends in an outer circumferential direction below the annular portion so that a contact with the stopper is caused that is arranged in a helical groove of the support path.

Thus, an upper end portion of the support pin contacts the protruding portion of the support path when the annular support pin moves along the helical groove of the support path. Additionally, the arm of the support pin contacts the engagement portion that is configured at the lower protruding portion when the support pin moves downward along the helical groove of the support path.

Overall, the configuration of the prior art expansion valve described supra is very complex. This level of complexity not the only problem. Rather, all prior art expansion valves have the disadvantage that they require a complicated and complex configuration to perform their function. This complicated configuration also has the inevitable effect that a simple replacement of the expansion valve or parts thereof is not possible.

Additionally, the prior expansion valves also have a problem in that they are subjected to a high level of wear. As a consequence, the prior art expansion valves have to be replaced rather often and typically in their entirety.

In addition to a simpler configuration which facilitates a simpler replacement of entire expansion valves as well as components thereof a wear reduced expansion valve is also highly desirable.

It is another disadvantage of the prior art expansion valves that their fabrication is complex and therefore expensive.

BRIEF SUMMARY OF THE INVENTION

Thus, it is an object of the invention to provide an expansion valve that overcomes the problems and disadvantages of the prior art described supra. In particular it is an object of the instant invention to provide an expansion valve that has little wear and that is configured compact. It is another object of the invention to provide an expansion valve that is particularly easily replaceable. It is another object of the instant invention to provide an expansion valve that facilitates pressure balancing between different spaces within the expansion valve in a low wear compact configuration that also facilitates a simple replacement.

It is another object of the invention to provide a method for producing an expansion valve that is less complex than the prior art methods.

The expansion valve according to the invention is operable by a stepper motor and includes the following: a housing; a hollow shaft that is arranged in the housing; a valve base element that supports the hollow shaft and that closes the housing; a rotor that is drivable by a stator; a center spool that is arranged within the hollow shaft and drivable by the rotor so that a rotation of the spool is transferrable through a threaded connection into an axial movement for opening and closing the expansion valve; and a spiral body that includes a thread turn and that is arranged on an enveloping surface of the hollow shaft and drivable by the rotor, wherein a stop element is arranged at the hollow shaft and movable in the thread turn of the spiral body and predetermines an upper end position and a lower end position of the center spool by forming part of a spool stopper structure.

The center spool is configured in particular as a threaded spool which converts a rotation of the rotor into a linear movement in cooperation with other elements, in this case an inner thread of the hollow shaft.

Thus, the center spool is connected with the rotor. The spiral body is a separate element and not part of the hollow shaft. Thus, the spiral body is also connected with the rotor so that the rotor can drive the spiral body.

The stop element is arranged in particular on the enveloping surface of the hollow shaft and contacts a first upper stop element when the center spool is in its lower end position and contacts a second lower stop element when the center spool is in its upper end position. The stop element can be a rod-shaped element. A pitch of the spiral body and of the spool determines whether the upper end position or the lower end position of the spool is predetermined.

Since the spiral body that includes the thread turn is separately drivable by the rotor and the stop element is arranged so that it is movable in the thread turn a particularly compact configuration of the expansion valve can be provided.

According to an advantageous embodiment of the invention the hollow shaft includes a longitudinal groove at the enveloping surface wherein the stop element is configured as a sliding ring that is secured against rotation in the thread turn of the spiral body by the longitudinal groove and movable in the axial direction.

Depending on the direction of rotation the sliding ring is moved axially up and down along the hollow shaft within the longitudinal groove.

Since the sliding ring is movable up and down within the longitudinal groove the overall size of the expansion valve can be reduced so that the expansion valve can be configured even more compact. The longitudinal groove and the sliding ring provide a simple configuration with a high level of functional reliability.

Furthermore, the packet including the spiral body and the siding ring is secured at the enveloping surface of the hollow shaft by securing the sliding ring in the longitudinal groove. Thus, the support groove in cooperation with the sliding ring provides loss safety.

According to an advantageous embodiment of the invention, the spool stopper structure is provided by a cooperation of the spiral body and the sliding ring.

According to an advantageous embodiment of the invention, the sliding ring includes a radially inward extending protrusion that is configured to run in the longitudinal groove and to act as a rotation safety.

This radially inward extending protrusion provides a simple option to secure the sliding ring against rotation so that the sliding ring is axially movable in the longitudinal groove in a reliable manner.

According to an advantageous embodiment of the invention, the spiral body includes a first stop element that extends in the axial direction of the spiral body and a second stop element that extends in the axial direction of the spiral body.

The axial direction of the spiral body is a direction that extends along an axis about which the spiral body is wound. In installed condition this axis is at least essentially concentric to a rotation axis of the hollow shaft and a rotation axis of the spool. In particular the first stop element extends in a direction opposite to an extension direction of a second stop element of the spiral body. Both directions, however, are axial directions of the spiral body.

According to an advantageous embodiment of the invention the lower end position of the spool is defined by the first stop element contacting with the stop body and the upper end position of the spool is defined by the second stop element contacting with the stop body plus a maximum torsion angle of the spiral body.

When the spiral body is a rigid body without torsion elasticity a maximum torsion angle of the spiral body is zero so that the upper end position of the spool is defined when the second stop element contacts the stop body.

However, when the spiral body is configured torsion elastic the spool is movable within limits of the elasticity of the spiral body also after the second stop element contacts the stop body. When the second stop element contacts with the stop body the upward movement of the spool is dampened. Alternatively the upper end position of the center spool can also be defined by the first stop element contacting with the stop body, wherein the lower position of the spool is defined when the second contact element contacts with the stop body plus the maximum torsion angle of the spiral body.

It is a function of a pitch of the spiral body and the pitch of the center spool whether the upper end position or the lower end position of the center spool is defined. In particular this is a function of the thread being a right turning thread or a left turning thread. Only when the pitch of the center spool differs from the pitch of the spiral body the first stop element defines the upper spool position. When the center spool and the spiral body have the same pitch direction a travel of the center spool and of the sliding ring is opposed. Accordingly, the first stop element also defines the lower spool position.

According to an advantageous embodiment of the invention, the sliding ring is configured as a cylindrical coil and includes an upper end and a lower end that is arranged opposite to the upper end, wherein the upper end comes in contact with the first stop element, and the lower end comes in contact with the second stop element.

Since the sliding ring is configured as a cylindrical spiral the sliding ring is retained particularly well within the spiral body. Furthermore, it is possible to configure the sliding ring, this means the cylindrical spiral so that the upper end and the lower end overlap. This means that the cylindrical spiral is provided over an angular range that exceeds 360 degrees wherein the overlap is the angular range over 360 degrees. This overlap of the ends and the number of windings of the spiral body can predetermine and or limit a maximum number of possible rotations.

According to an advantageous embodiment of the invention, the spiral body is connected by the first stop element with an adapter element so that the spiral body is co-rotated when the rotor is rotated, wherein the adapter element connects the rotor with the spool in order to rotate the spool with the rotor.

Thus, the adapter element is connected in a force transferring manner with the spool e.g. by a press fit, a weld, or form locking. The adapter element can be connected with the rotor in a forming locking manner. For this purpose, the adapter element does not have a rotation symmetric cross section. For example, the outer shape of the adapter element can have a triangular cross section viewed along the rotation axis R or it can be rectangular or polygonal or e.g. also with teeth. The inner shape of the rotor may then have a cross section that is complementary to the shape of the adapter element.

This means that the first stop element of the spiral body performs a double function in addition to the function as a stop element it also functions as a driver element, this means connector element to the rotor or as the adapter.

Since the rotation of the rotor is not directly but indirectly transferred by the adapter it is also possible to produce different expansion valves, e.g. with different rotors with as many identical components as possible.

According to an advantageous embodiment of the invention the spiral body is a torsion spring that is configured as a coil spring made from steel.

The steel has sufficient elasticity to be formed into a spiral body. Thus production of the spiral body is facilitated.

According to an advantageous embodiment of the invention the hollow shaft is made from a synthetic material, advantageously polyphenylene sulfide (PPS) or poly ether ketone (PEEK) or brass or bronze.

When using a synthetic material, the expansion valve is weight reduced compared to using a metal material. Additionally, the synthetic materials (PPS) and (PEEK) are high performance materials so that they are continuously useable in a high temperature range up to 240° C. and for short time periods up to 300° C. Consequently, the expansion valve can also be used under extreme conditions without any concern of the expansion valve failing.

According to an advantageous embodiment of the invention the expansion valve furthermore includes a sleeve element that includes a receiving portion and a valve needle, wherein the receiving portion receives a plunger shaped end portion of the center spool, a compression spring and a force transmission element in their entirety.

Since the expansion valve is configured with a sleeve element of this type that performs the function of the valve needle and that provides a receiving portion on the other hand side a particularly compact configuration of the expansion valve can be achieved. In spite of the compact configuration all functions of the expansion valve can be performed reliably.

According to an advantageous embodiment of the invention the force transmission element is configured and arranged so that a contact with the center spool transfers axial forces from the center spool through the compression spring to the sleeve element, wherein a cross section of the force transmission element is configured mushroom shaped so that torques are transmitted from the center spool to the force transmission element not at all or only up to a limited amount.

Since the force transmission element is configured mushroom shaped a contact point, this means the force transmission point to the center spool is small. Torques are only transferred by friction up to a limited amount to the force transmission element at the force transmission point. Overall, this leads to an expansion valve with particularly low wear.

According to an advantageous embodiment of the invention the housing and a side of the valve base element that is oriented towards the housing define an interior housing cavity wherein a hollow shaft interior cavity is formed within the hollow shaft wherein a fluid inlet cavity is arranged adjacent to a side of the valve base element that is oriented away from the housing in a condition where the expansion valve is installed in a valve installation space, wherein a first pressure balancing channel is arranged that balances a pressure between the fluid inlet cavity and the housing interior, wherein the first pressure balancing channel includes a first channel portion and a second channel portion and wherein the second channel portion is formed by the longitudinal groove.

Also this facilitates a particularly compact configuration of the expansion valve, in particular components can be eliminated in that existing components are assigned a second function.

Thus, the longitudinal groove does not only have the function of guiding the slip ring but also performs the function of a pressure balancing channel. Thus, the longitudinal groove performs a double function since it supports the slip ring and additionally forms a portion of the second pressure balancing channel.

According to an advantageous embodiment of the invention a second pressure balancing channel provides pressure balancing between the hollow shaft interior and the housing interior in a portion where the longitudinal groove and the hollow shaft interior cavity has a maximum radial extension.

This facilitates reliable pressure compensation between the hollow shaft interior cavity and the housing interior cavity.

Another solution according to the invention relates to an expansion valve that is operable by a stepper motor, the expansion valve comprising: a housing; a hollow shaft that is arranged in the housing; a valve base element that supports the hollow shaft and closes the housing; a rotor that is drivable by a stator; a center spool that is arranged within the hollow shaft and drivable by the rotor so that a rotating movement of the spool is transferrable through a threaded connection into an axial movement for opening and closing the expansion valve; an adapter element that transfers a torque from the rotor to the spool and is arranged between the rotor and the spool; and a spiral body that is arranged on a jacket side of the hollow shaft and rotatable by the adapter element, wherein the spiral body includes an axially extending first stop element that is arranged in an off center opening of the adapter element.

Since the adapter element is arranged between the spool and the rotor the configuration of the expansion valve is overall more universal. This means e.g. that different rotors can be used. Furthermore, the adapter performs a second function since it drives the spiral body to rotate.

The adapter element includes central rotation axis R wherein the off-center opening is arranged off center from the center rotation axis R.

According to an advantageous embodiment of the invention the adapter element includes a plate shaped base portion and a receiving portion for the center spool that centrally extends from the plate shaped base portion in an axial direction.

The axially extending receiving portion has the advantage that a tolerance for the bore hole can be expanded since a long support reduces an ability of the components to tilt relative to each other.

The connection between the spool and the adapter element is performed e.g. after alignment at a top side of the spool. The connection can be provided by laser welding wherein several weld points are advantageously provided.

Since only the base portion is configured plate shaped weight can be saved compared to a completely plate shaped adapter element.

According to an advantageous embodiment of the invention a central pass through opening along the rotation axis R of the adapter element is configured to receive an upper portion of the spool.

The central pass through opening extends along the rotation axis R of the adapter element, a cross section of the central pass through opening is advantageously circular in order to facilitate a particularly simple alignment of the spool stopper structure or of the upper stop.

However, the central pass through opening does not have to be a circular opening. The cross section of the central pass through opening does not have to be rotation symmetrical. For example, the pass-through opening can be triangular, rectangular or polygonal or configured with a teething configured along the rotation axis R.

This facilitates a particularly simple force transmission from the adapter element to the spool, more precisely to the upper portion of the spool. The upper portion of the spool has a cross section that is complementary to the shape of the central pass through opening.

According to an advantageous embodiment of the invention, the outer shape of the adapter element is not rotation symmetrical with respect to the rotation axis R.

According to an advantageous embodiment of the invention the off-center opening is arranged in the plate shaped base portion wherein the plate shaped base portion advantageously includes additional off-center openings.

Since the off-center opening is arranged in the plate shaped base portion of the adapter element it can be arranged far away from a center, i.e. the rotation axis of the adapter element. A larger distance between the off center opening and the rotation axis R facilitates better force transmission through a longer lever arm.

Arranging additional off-center openings facilitates integrating additional functions into the adapter element.

According to an advantageous embodiment of the invention the off-center openings are configured as slotted holes.

Slotted holes have the advantage of being simpler to fabricate since they can be introduced into the adapter element or into the plate shaped base portion of the adapter element from a side, this means at a right angle to the rotation axis.

According to an advantageous embodiment of the invention at least one of the additional off-center openings is arranged so that it balances a pressure in the housing interior space above the adapter element and below the adapter element.

Thus, the adapter element additionally performs a pressure balancing function. One more time a component is configured so that it can perform several functions which further reduces the component count.

According to an advantageous embodiment of the invention the spiral body includes a thread turn, wherein the hollow shaft includes a longitudinal groove at the enveloping surface and wherein a sliding ring is arranged in the thread turn of the spiral body axially movable and torque proof in the longitudinal groove.

Since the sliding ring is movable up and down within the longitudinal groove an installation size of the expansion valve can be reduced overall so that the expansion valve can be configured more compact. The longitudinal groove and the sliding ring provide a simple configuration with a high level of functional reliability.

Since the sliding ring is secured in the longitudinal groove the packet including the spiral body and the sliding ring is also secured at the enveloping surface of the hollow shaft. Thus, the support groove together with the sliding ring also functions as a loss safety.

According to an advantageous embodiment of the invention the cooperation of the spiral body and of the sliding ring forms a spool stopper structure that determines an upper end position and a lower end position of the center spool.

According to an advantageous embodiment of the invention the spiral body includes a second stop element that extends in an axial direction opposite to the first stop element.

According to an advantageous embodiment of the invention the sliding ring is configured as a cylindrical spiral that includes an upper end and a lower end.

When the sliding ring is configured as a cylindrical spiral a particularly good retention of the sliding ring within the spiral body can be achieved. Furthermore, it is possible to configure the sliding ring this means the cylindrical spiral so that the upper end and the lower end of the sliding ring overlap. Thus, the cylindrical spiral extends beyond a full circle, this means beyond 360°. Thus, the overlap is the portion that extends beyond the full circle. This overlap of the ends and the number of windings of the spiral body can predetermine and/or limit the maximum number of revolutions.

According to an advantageous embodiment of the invention a radially inward extending protrusion is configured at one of the two ends.

This radially inward extending protrusion offers a simple option to secure the sliding ring against rotation so that the sliding ring is reliably movable in the axial direction in the longitudinal groove.

According to an advantageous embodiment of the invention the radially inward extending protrusion of the sliding ring is configured to extend in the longitudinal groove of the hollow shaft so that it functions as a rotation safety.

According to an advantageous embodiment of the invention a lower end position of the spool is defined by a contact of the first stop element at the upper end and the upper end position of the spool is defined when the second stop element contacts the lower end plus a maximum torsion angle of the spiral body.

When the spiral body is a body that cannot be preloaded in the rotation direction, thus the spiral body is rigid and not torsion elastic the maximum torsion angle of the spiral body is zero. Then the upper end position of the spool is predetermined when the second stop element contacts the stop body. However, when the spiral body is configured torsion elastic, thus pre-loadable in the rotation direction, the spool is still movable even after the contact of the second stop element at the stop body since the spool preloads the spiral body.

This means that the rotation of the spool is dampened in upward direction when the second stop element contacts the stop body.

As an alternative thereto, the upper end position of the spool can also be predetermined when the first stop element contacts the stop body, wherein the lower end position of the spool is defined by the contact of the second stop element at the stop body plus the maximum torsion angle of the spiral body.

It is determined by the pitch of the spiral body whether the upper end position of the spool or the lower end position of the spool is defined. This depends in particular from the thread being a right-hand thread or a left-hand thread. Only when the thread pitch of the spool differs from the thread pitch of the spiral body, the first stop element also defines the upper spool position. When the spool and the spiral body have the same thread pitch direction a travel path of the spool and of the sliding ring is opposite. Accordingly, the first stop element then also determines the lower spool position.

According to an advantageous embodiment of the invention the spiral body is a torsion spring that is configured as a steel coil spring.

Thus, the spiral body can be fabricated in a particularly simple and cost-effective manner.

The object is also achieved by an expansion valve operable by a stepper motor, the expansion valve comprising: a housing; a hollow shaft arranged in the housing; a valve base element that supports the hollow shaft and doses the housing; a rotor that is drivable by a stator; a center spool that is arranged within the hollow shaft and drivable by the rotor so that a rotating movement of the spool is transferable by a threaded connection into an axial movement for opening and closing the expansion valve; and a sleeve element that includes respectively at least a portion of the center spool, a compression spring and a force transfer element in a receiving portion and that includes a valve needle, wherein the receiving portion of the sleeve element is closed by a bushing, wherein the spool is made from a first material and the bushing is at least partially made from a second material that differs from the first material, wherein the second material has a lower hardness than the first material, wherein the second material is a sinter material.

Since the sleeve element includes a valve needle and a receiving portion, this means the valve needle body is configured sleeve shaped, a particularly compact configuration of the expansion valve can be achieved. This is in particular caused by the fact that elements required for the force transmission to the valve needle can be arranged in the receiving portion in a space saving manner.

During operation components are provided that perform a rotating movement and components that do not perform a rotating movement. In particular the spool performs a rotating movement, whereas the sleeve element is not supposed to perform any rotation at all. A contact of rotating elements with elements that do not rotate wears the elements.

The expansion valve according to the invention solves this problem in that a selected tribological pairing is provided between contacting elements that move relative to each other. Thus, wear can be controlled so that the wear primarily occurs at one of the components involved. Additionally, this component can be optionally provided as a wear part that can be replaced easily.

Thus, the bushing that closes the sleeve element can be a wear component that is easily replaceable. When the bushing is worn it can be replaced easily and not the entire sleeve element including the valve needle has to be replaced. Thus, maintenance cost can be reduced significantly.

The tribological pairing is selected so that the bushing is made from a softer material, this means a material with a reduced hardness compared to the first material. Thus, the wear occurs primarily at the bushing. Though there may be an option to replace the bushing, the bushing is advantageously sized so that it can wear over the life of the valve.

Overall, the expansion valve according to the invention provides a compact configuration with an engineering design that is configured for a targeted and controlled wear. The wear elements themselves can be replaceable in a simple manner.

The bushing is pressed in particular into the sleeve element, this means it is connected by a press fit.

A bushing according to the instant invention is an annular or hollow cylindrical element. Advantageously, however, the sleeve element is a hollow cylindrical element that is characterized in that it extends further in the axial direction of the rotation axis than the annular element. Accordingly, a hollow cylindrical wear element provides more wearable material than an annular wear element.

Sintered materials are materials that have a multitude of pores that can be filled with lubricants. For example, 10 to 40 volume percent, advantageously 15 to 30 volume percent of the bushing can then be formed by the pores.

The pores facilitate introducing a lubricant directly into the bushing. This reduces friction between the bushing and the spool. This quickly stops a torque transfer from the spool to the bushing.

The spool transfers torque to the bushing, the sleeve element and the force transmission element. The bushing, the sleeve element with the valve needle and the force transmission element rotate at the same speed as the spool until the valve needle in the valve seat is restricted with respect to its axial movement and the effective torque is less than a torque at the contact location of sleeve and spool. Therefore, the friction at the contact location between the bushing and the spool shall be kept to a minimum so that the valve needle is stopped quickly in the valve seat and a relative movement between spool and bushing occurs instead.

According to an advantageous embodiment of the invention the bushing is oil infused.

Due to the oil infusion the bushing is configured self-lubricating. Therefore the bushing is maintenance free and ready to be installed. Adhesion forces causes the oil to be dispensed and when a stand still occurs the oil is absorbed by the bushing due to capillary effects. Additional lubrication is not necessary under normal operation conditions. Additional lubrication, however, can extend the service life of the expansion valve.

According to an advantageous embodiment of at least 15 volume percent, advantageously 20 volume percent, and particularly advantageously 25 volume percent of the bushing include oil.

This means also that at least 15 percent by volume, advantageously at least 20 percent by volume, particularly advantageously 25 percent by volume of the bushing is formed by pores.

Thus, a large oil supply can be provided for lubrication.

According to an advantageous embodiment of the invention the first and the second material are metals or metal alloys.

According to an advantageous embodiment of the invention the sintered material is a copper alloy, advantageously bronze, the second material is steel, in particular stainless steel.

In particular the material pairing of stainless steel and bronze provides a good balance between wear and production cost. On the one hand side the second material must not be too soft in order not to wear too quickly and on the other hand side the second material must not be too hard so that the element made from the first material does not get damaged.

According to an advantageous embodiment of the invention the second material is a sintered bronze material.

The sintered bronze has particularly advantageous properties, in particular the sintered bronze is rather light. Furthermore the sintered bronze is very corrosion resistant which is supported by the large amount of lubrication due to the high number pores that is possible. Furthermore, the bushing made from sintered bronze can also be produced with a high level of precision during master forming.

According to an advantageous embodiment the sintered bronze has the following composition: 5%-18%, advantageously 9%-11% is tin, 0%-3% advantageously graphite, the rest is copper.

A large portion of the sintered bronze designated supra as the rest is made from copper. In particular at least 79% of the sintered bronze is made from copper. The tin increases strength and the material reaches its maximum strength with 10%-15% tin.

Particularly advantageously the force transmission element is made from the first material, e.g. stainless steel. Furthermore, also the sleeve element is advantageously formed from the first material, this means stainless steel.

According to an advantageous embodiment of the invention the force transmission element includes a head portion and a shaft portion, wherein the force transmission element is arranged so that a contact for transferring axial forces from the center spool is punctiform in a center portion of the head portion.

This punctiform transmission keeps the contact surface for transmitting the torque between the spool and the force transmission element at a minimum. Due to the minimized small contact surface the spool slips during rotation and the force transmission element is not caused to rotate. On the other hand, side axial forces can also be reliably transferred from the spool to the force transmission element through the punctiform contact.

This means torque is interrupted at the contact surface between the force transmission element and the center spool. A torque impacts the rotor that is driven by the stator wherein the torque is transferred e.g. through friction locking through the adapter to the spool. The threaded connection of the spool transposes the rotating movement into an axial movement of the spool. Thus, only the axial movement at the valve needle is desirable, this means a rotation of the valve needle at this location is undesirable.

According to an advantageous embodiment of the invention the compression spring is arranged in portions on an enveloping surface of the shaft portion of the force transmission element.

Since the compression spring is arranged on the enveloping surface of the shaft portion the compression spring is supported on its inside by the shaft portion. On the other hand side, the compression spring is supported on the outside by the inner surface of the receiving portion of the sleeve element. This means that the compression spring is reliably supported between the shaft portion of the force transmission element and the receiving portion of the sleeve element.

Thus, the compression spring does not have to contact the two elements. It is also conceivable that a clearance between the enveloping surface of the shaft portion and the compression spring is provided as well as between the compression spring and the inner portion of the receiving portion. However, the compression spring is supported at a distance that is long enough so that a kinking during compression of the spring is avoided.

According to an advantageous embodiment the compression spring is a cylindrical coil spring.

Thus, the compression spring has low fabrication cost and can be reliably arranged about the enveloping surface of the shaft portion.

According to an advantageous embodiment of the invention an axial length of the shaft is long enough so that the shaft portion comes in contact with a sleeve base of the sleeve element when the axial force exceeds a level that causes the compression spring to be compressed by a predetermined amount of spring travel.

This means an axial force can be transferred directly from force transmission element to the sleeve base when the compression spring is compressed by the predetermined amount of spring travel. Thus, a maximum stroke limitation can be provided when the mechanical stop, this means the spool stop structure fails or when the valve is overloaded.

Thus, the force transmission element performs several functions as well. First of all, the force transmission element facilitates a torque decupling of the sleeve element from the spool. Furthermore, the force transmission element or its shaft portion supports the compression spring in axial directions and thus prevents a kinking or generally an asymmetrical deformation of the compression spring. Furthermore, the shaft portion provides the limitation of the maximum stroke described supra.

According to an advantageous embodiment of the invention the spool includes a plunger shaped end portion that is configured and arranged so that the end portion contacts the force transmission element in order to transfer axial forces, wherein an upper portion of the plunger shaped end portion comes in frictional contact with the bushing.

This means that a lower portion, more precisely a bottom side of the plunger shaped end portion comes in contact with the force transmission element and an upper portion of the plunger shaped end portion comes into frictional contact with the bushing. Thus, the plunger shaped end portion is arranged between the bushing and the force transmission element According to an advantageous embodiment of the invention the receiving portion is configured so that it receives the bushing, the plunger shaped end portion, the compression spring and the force transmission element in its entirety.

The compression spring is arranged in a lower portion of the receiving portion, this means directly above the sleeve bottom. The force transmission element is arranged above the compression spring and the plunger shaped end portion of the spool is arranged above the force transmission element. The bushing is arranged above the plunger shaped end portion which closes the receiving portion overall.

This provides a particularly compact embodiment of the expansion valve.

According to an advantageous embodiment of the invention the expansion valve includes a valve seat wherein the valve base element is integrally provided in one piece and receives portions of the valve seat, the sleeve element, and the hollow shaft.

Thus, the valve base element is configured as a replaceable valve cartridge. Since only the valve base element has to be removed from a valve installation cavity a simplified valve replacement is facilitated. Furthermore, also the valve becomes more compact since a plurality of functions is intergraded into the valve base element.

Furthermore, providing the valve base element integrally in one piece offers the option to integrate the valve in a customer specific installation space by adapting only one component, thus the exterior of the valve base element. This helps to reduce cost since identical components can be used for various expansion valves. Furthermore, the component count is reduced which reduces costs even further. Assembly complexity of the expansion valve is reduced as well.

According to an advantageous embodiment of the invention the valve base element includes a valve seat receiving portion in an upper portion that is configured to receive a hollow shaft and the sleeve element.

Thus, the valve base element includes receiving portions that facilitate integrating the elements of the expansion valve into the valve base element in a simple manner.

According to an advantageous embodiment of the invention the sleeve element is arranged in the receiving portion at least partially within the hollow shaft.

The receiving portion reduces the installation space in an axial direction of the expansion valve.

According to an advantageous embodiment of the invention the force transmission element is configured so that it does not receive any torque or only a limited amount of torque from the spool.

This limitation is provided at the punctiform contact surface between the force transmission element and the center spool.

According to an advantageous embodiment of the invention the expansion valve includes a spool stopper structure that limits the rotating movement of the spool between an upper end position and a lower end position.

According to an advantageous embodiment of the invention the spool stopper structure is configured by a cooperation of a spiral body and a stop body.

The object is also achieved by an expansion valve operable by a stepper motor, the expansion valve comprising a housing; a hollow shaft that is arranged at the housing; a valve base element that supports the hollow shaft and closes the housing; a rotor that is drivable by a stator; a center spool that is arranged within the hollow shaft and drivable by the rotor so that a rotating movement of the spool is transferable through a threaded connection into an axial movement for opening and closing the expansion valve; and a sleeve element that includes a valve needle that is pressable into a valve seat, wherein the valve base element is a body that is integrally provided in one piece and at least partially receives the valve seat, the sleeve element and the hollow shaft.

The valve base element is therefore configured as a valve cartridge. This has the advantage of simplified valve replacement since only the valve base element has to be removed from the valve installation space. On the other hand side, a particularly compact configuration can be achieved since a plurality of functions is integrated in the valve cartridge, this means in the valve base element.

Additionally, a valve base element that is integrally provided in one piece offers the option to integrate the valve into a customer specific installation space by only adapting one component. Thus, a plethora of different valves can be implemented that advantageously differ from each other only with respect to the valve base elements.

Thus, the inner portion of the different valve base elements is always configured identical so that the functional components in the interior can be installed into many different expansion valves. The outer shape of the valve base elements, however, can be adapted to the customer specific installation space so that the different valve base elements differ in that respect.

This helps in particular to save fabrication costs since identical components can be used for different expansion valves. Complexity of assembly of the expansion valve also decreases.

According to an advantageous embodiment of the invention, the valve base element includes a valve seat receiving portion in a lower portion and a receiving portion in an upper portion wherein the receiving portion is configured to receive the hollow shaft and the sleeve element.

Thus, the valve base element includes receiving portions that facilitate functionally integrating the necessary elements of the expansion valve into the valve base element in a simple manner. The receiving portion also reduces the installation space required in an axial direction of the expansion valve.

According to an advantageous embodiment of the invention the sleeve element is at least partially arranged in the receiving portion within the hollow shaft.

This helps to save additional installation space. The receiving portion can be arranged in a plane wherein the rotation axis R is an orthogonal of the plane. The hollow shaft is arranged in the receiving portion in a radially inward direction. Thereafter the sleeve element is arranged in the radially inward direction, this means within the hollow shaft. A portion of the center spool and/or a respective force transmission element are arranged in a radially inward direction.

This yields a very compact configuration. Since several elements are placed into a plane a length in the axial direction can be reduced accordingly. This means that the expansion valve can be shortened in length compared to the prior art. In particular in automotive installations installation space is severely limited so that shorter valves offer more installation options.

According to an advantageous embodiment of the invention the valve base element includes a housing seat which is respectively arranged and configured in a radially circumferential direction at a respective upper portion of the valve base element so that the housing seat receives and encloses the housing.

Thus, the housing can reliably enclose all components in its interior.

According to an advantageous embodiment of the invention the valve base element includes a lower seal receiving portion and an upper seal receiving portion.

Arranging two different seal receiving portions helps to achieve reliable sealing even when the valve base element is integrally provided in one piece.

According to an advantageous embodiment of the invention the valve base element incudes pressure balancing devices.

This means that the valve base element is configured so that pressure balancing devices, e.g. pressure balancing channels are integrated therein. Purposeful integration of pressure balancing channels or pressure balancing devices facilitates implementing the valve base element as a one piece component without impairing the functions of the expansion valve.

According to an advantageous embodiment of the invention the housing and a side of the valve base element that is oriented towards the housing define an interior housing cavity wherein a first pressure balancing device is arranged as a first pressure balancing channel between the housing interior and the fluid inlet cavity.

The first pressure balancing channel advantageously includes a first channel portion that is at least practically arranged in the valve base element and a second channel portion that is at least partially arranged in the hollow shaft, wherein the first channel portion and the second channel portion are connected with one another by a circumferential connection portion.

During operations an imbalance between active forces in particular above and below the intermediary components has to be prevented, if possible at all. This is achieved e.g. in that a high pressure provided at the inlet is conducted upward. Overall the pressure balancing channels are configured to prevent a pressure stasis in one of the cavities of the expansion valve that could interfere with the function of the expansion valve.

According to an advantageous embodiment of the invention the expansion valve includes a second pressure balancing channel to provide pressure balancing between a hollow shaft interior and the housing interior, wherein the hollow shaft interior is configured within the hollow shaft.

According to an advantageous embodiment of the invention the sleeve element includes a receiving portion in which a plunger shaped end portion of the center spool, a compression spring and a force transmission element are received in their entirety, wherein the receiving portion is arranged entirely within the valve base element viewed in cross section.

This helps to save installation space. The hollow shaft is arranged in a radially inward direction in the receiving portion. The sleeve element is arranged in a radially inward direction, this means within the hollow shaft. The plunger shaped end portion of the center spool, the compression spring, and the force transmission element are arranged in a radially inward direction.

This yields a particularly compact configuration. Since plural elements are placed in one plane a length in the axial direction can be reduced.

According to an advantageous embodiment of the invention the expansion valve includes a third pressure balancing channel that is arranged between a receiving portion of the sleeve element and a lower interior portion of the valve base element wherein the valve needle is arranged axially moveable in the interior of the valve base element.

The third pressure balancing channel provides pressure balancing between a space formed in the receiving portion of the sleeve element and a lower interior portion of the valve base element. The lower interior portion of the valve base element is in turn connected through a fluid bore hole with the fluid inlet cavity so that pressure balancing through the fluid bore hole can occur.

Thus, sufficient pressure balancing between all spaces that are configured or arranged within and also partially adjacent to the expansion valve is achieved reliably with a simple engineering configuration.

According to an advantageous embodiment of the invention the force transmission element includes a head portion and a shaft portion, wherein the force transmission element is arranged so that a contact with the center spool is provided punctiform in a center portion of the head portion.

The punctiform contact surface between the spool and the force transmission element transfers very little torque or no torque at all. Therefore the spool slips during rotation and the force transmission element is not caused to rotate. Axial forces, however, can also be transferred reliably from the spool to the force transmission element. Therefore, a torque interruption occurs at the contact surface between the force transmission element and the center spool.

According to an advantageous embodiment of the invention the compression spring is arranged in portions on an enveloping surface of the shaft portion of the force transmission element.

Since the compression spring is arranged on the enveloping surface of the shaft portion the compression spring is supported on the one hand side on the shaft portion. On the other hand side the compression spring is supported on the outside by the inner surface of the receiving portion of the sleeve element.

Thus, the compression spring does not have to contact both elements. Rather it is also conceivable that a clearance is configured between the enveloping surface of the shaft portion and the compression spring and between the compression spring and the inner surface of the receiving portion. However, the compression spring is supported so that a wedging is prevented when the spring is compressed.

According to an advantageous embodiment of the invention the compression spring is a cylindrical coil spring.

Since the compression spring is a cylindrical coil spring fabrication is particularly cost effective and the compression spring can be reliably arranged about the enveloping surface of the shaft portion.

According to an advantageous embodiment of the invention the shaft portion is long enough so that the shaft portion comes in contact with a sleeve base of the sleeve element when an axial force is exceeded that leads to a compression of the compression spring by a predetermined spring travel.

This means an axial force is statically transferrable from the force transmission element to the sleeve base when the compression spring is compressed by a predetermined spring travel. Thus, a maximum stroke limitation is provided when the mechanical stop fails, this means the spool stopper structure fails or when an overload of the valve occurs.

Thus, also the transmission element performs plural functions. First of all the transmission element facilitates a torque decupling of the sleeve element from the spool. Furthermore, the transmission element or its shaft portion supports the compression spring in axial directions and thus prevents a kinking or generally an asymmetrical deformation of the compression spring. Furthermore, the shaft portion provides the maximum stroke limitation described supra.

The object is also achieved by an expansion valve configured to be driven by a stepper motor and configured to be installed into a valve installation cavity, the expansion valve comprising; a housing; a hollow shaft that is arranged at the housing; a valve base element that supports the hollow shaft and that closes the housing; a rotor that is drivable by a stator; and a center spool that is arranged within the hollow shaft and drivable by the rotor so that a rotating movement of the spool is transferable through a threaded connection into an axial movement for opening and closing the expansion valve, wherein the housing and a side of the valve base element that is oriented towards the housing define a housing cavity, wherein a hollow shaft cavity is configured within the hollow shaft, wherein a fluid inlet cavity is arranged adjacent to a side of the valve base element that is oriented away from the housing in a condition where the expansion valve is installed in a valve installation cavity, wherein the housing cavity is connected with the fluid inlet cavity through a first pressure balancing channel in order to provide pressure balancing, wherein the first pressure balancing channel includes a first channel portion that is at least partially arranged in the valve base element and a second channel portion that is at least partially arranged in the hollow shaft, wherein the first channel portion and the second channel portion are connected with each other through a circumferential connection portion.

Thus, the expansion valve includes a plurality of cavities that are configured within or adjacent to the expansion valve. An imbalance between acting forces, in particular above and below intermediary components have to be prevented in as far as possible. This is done e.g. by venting high pressure provided at the inlet in an upward direction. Overall, the pressure balancing channels prevent a pressure stasis in one or plural cavities of the expansion valve that could interfere with the function of the expansion valve.

In assembled condition of the expansion valve the hollow shaft is arranged in the valve base element, more precisely in one or the receiving portion of the valve base element. The first channel portion is at least partially arranged in the valve base element and the second channel portion is at least partially arranged in the hollow shaft.

In order to provide pressure balancing between the first channel portion and the second channel portion, the first channel portion and the second channel portion need to be flow connected. The flow connection is provided through the circumferential connection portion. Since the connection portion is configured as a circumferential connection portion that forms the necessary flow connection between the two portions the valve base element and the hollow shaft do not have to be aligned with each other during assembly. This facilitates assembly and assembly errors can be avoided that could lead to a failure of the expansion valve.

According to an advantageous embodiment of the invention the circumferential connection portion is a circumferential relief groove which is arranged at an inner circumference of a receiving portion of the valve base element.

The circumferential relief groove provides a reliable fluid connection between the first channel portion and the second channel portion.

According to an advantageous embodiment of the invention the circumferential connection portion is a circumferential bevel that is arranged at an outer circumference of the hollow shaft.

This has in particular the advantage that the bevel is producible in a simpler and more cost-effective manner than the circumferential relief groove in the receiving portion.

When a particularly quick pressure balancing is required a circumferential relief groove and a circumferential bevel can be arranged.

According to an advantageous embodiment of the invention the second channel portion is configured as a longitudinal groove that extends in the hollow shaft from a portion that is arranged in the valve base element to a portion that is not arranged in the valve base element.

The longitudinal groove is producible in a particularly simple manner, wherein the longitudinal groove is in particular a longitudinal groove in which the slide ring described supra moves in an axial direction. Thus, the longitudinal groove performs a double function since it is not only configured as a second channel portion but also supports the slide ring that performs functions of the expansion valve as part of the spool stopper structure.

According to an advantageous embodiment of the invention the expansion valve includes a second pressure balancing channel to provide pressure balancing between the hollow shaft cavity and the housing cavity wherein the second pressure balancing channel is at least partially formed by the second channel portion.

Put differently portions of the second channel portion also form portions of the second pressure balancing channel.

According to a second embodiment of the invention a second pressure balancing channel is arranged in a portion of a maximum radial extension of the longitudinal groove and of the hollow shaft cavity.

This means that the second pressure balancing channel is arranged at a base of the longitudinal groove. In particular the pressure balancing channel is an opening in a base of the longitudinal groove.

Thus, the longitudinal groove can provide pressure balancing between the hollow shaft interior and the housing interior not only as a second channel portion but also as a portion of the second balancing channel in addition to pressure balancing between the fluid inlet cavity and the housing cavity.

When introducing the longitudinal groove into the hollow shaft provided with the hollow shaft cavity the second channel portion of the first pressure balancing channel and the second pressure balancing channel can be formed simultaneously.

According to an advantageous embodiment of the invention the expansion valve includes an adapter element that is arranged between the rotor and the spool to transfer a torque from the rotor to the spool wherein the adapter element includes at least one off center opening that is arranged so that it balances a pressure in the housing cavity above the adapter element and below the adapter element.

The off center opening in the adapter element facilitates balancing a pressure within the housing cavity, namely between an upper portion above the adapter element and a lower portion below the adapter element in a quick and simple manner. This further increases functional reliability of the expansion valve.

According to an advantageous embodiment of the invention the expansion valve includes a third pressure balancing channel that is arranged between a receiving portion of a sleeve element that includes a valve needle of the expansion valve and a lower inner portion of the valve base element in which the valve needle is arranged axially moveable and that is connected through a fluid bore hole with the fluid inlet cavity.

The third pressure balancing channel thus provides pressure balancing between a cavity that is formed in the receiving portion of the sleeve element and a cavity in a lower interior portion of the valve base element. The lower inner portion of the valve base element is in turn connected through a fluid bore hole with the fluid inlet cavity so that a pressure compensation through the fluid bore hole can be performed at this location as well.

Thus, a reliable and sufficiently pressure balancing is achieved through all cavities that are formed or arranged within and partially also adjacent to the expansion valve, e.g. the fluid inlet cavity using a simple engineering design.

According to an advantageous embodiment of the invention a plunger shaped end portion of the center spool, a compression spring and a force transmission element are also received in the receiving portion of the sleeve element.

This yields a particularly compact configuration of the expansion valve which, however, can perform all functions.

According to an advantageous embodiment of the invention the force transmission element is configured and arranged so that it transfers axial forces from the center spool through the compression spring to the sleeve element through a contact with the center spool, wherein the force transmission element has a mushroom shaped cross section.

According to an advantageous embodiment of the invention the force transmission element includes a head portion and a shaft portion, wherein the force transmission element is configured so that the contact with the center spool is punctiform in a central portion of the head portion.

Due to the punctiform contact surface between the spool and the force transmission element no torque or hardly any torque can be transferred. Therefore the spool slips during rotation and the force transmission element is not caused to rotate. Axial forces, however, can also be transferred reliably by the punctiform contact surfaces from the spool to the force transmission element. Therefore, there is a torque interruption at the contact surface between the force transmission element and the center spool.

According to an advantageous embodiment of the invention the expansion valve includes a valve seat, wherein the valve base element is an element that is integrally provided in one piece and that receives the valve seat, the sleeve element, and the hollow shaft at least in portions.

Thus, the valve base element is configured as a cartridge. On the one hand side this has the advantage of simplified valve replacement since only the valve base element has to be removed from the valve installation cavity. However a particularly high level of compactness can be achieved since a plurality of functions is integrated in the valve cartridge, this means in the valve baes element.

Furthermore, a valve base element of this type that is configured integrally in one piece offers the option to integrate the valve into a customer specific installation space by merely adapting one component. This saves in particular fabrication costs since identical components can be used for various expansion valves. Additionally, complexity during assembly of the expansion valve decreases.

According to an advantageous embodiment of the invention the valve base element includes a lower seal receiving portion and an upper seal receiving portion.

Arranging two different seal receiving portions facilitates achieving reliable sealing also for a valve base element that is integrally provided in one piece.

The object is furthermore achieved by a method for producing an expansion valve, the method compromising: providing the hollow shaft; and introducing a longitudinal groove into the hollow shaft.

According to an advantageous embodiment of the invention the second pressure balancing channel is formed in the hollow shaft when introducing the longitudinal groove.

Simultaneous introduction of the second pressure balancing channel allows to omit an otherwise additionally required process step for separately introducing the second pressure balancing channel

BRIEF DESCRIPTION OF THE DRAWINGS

The invention is now described in more detail based on embodiments with reference to the appended a drawing figure. Thus, additional advantageous embodiments and feature combinations of the invention can also be derived from the subsequent description and the entirety of the patent claims. The invention is now described in more detail based on embodiments with reference to the appended drawing figure, wherein:

FIG. 6 illustrates a schematic view of a sliding ring of the expansion valve according to the invention;

FIG. 7 illustrates a top view of the sliding ring of FIG. 6;

FIG. 8 illustrates a schematic view of a hollow shaft of the expansion valve according to the invention;

FIG. 9 illustrates a schematic view of the spool stopper geometry of the expansion valve according to the invention;

DETAILED DESCRIPTION OF THE INVENTION

Figure 1:
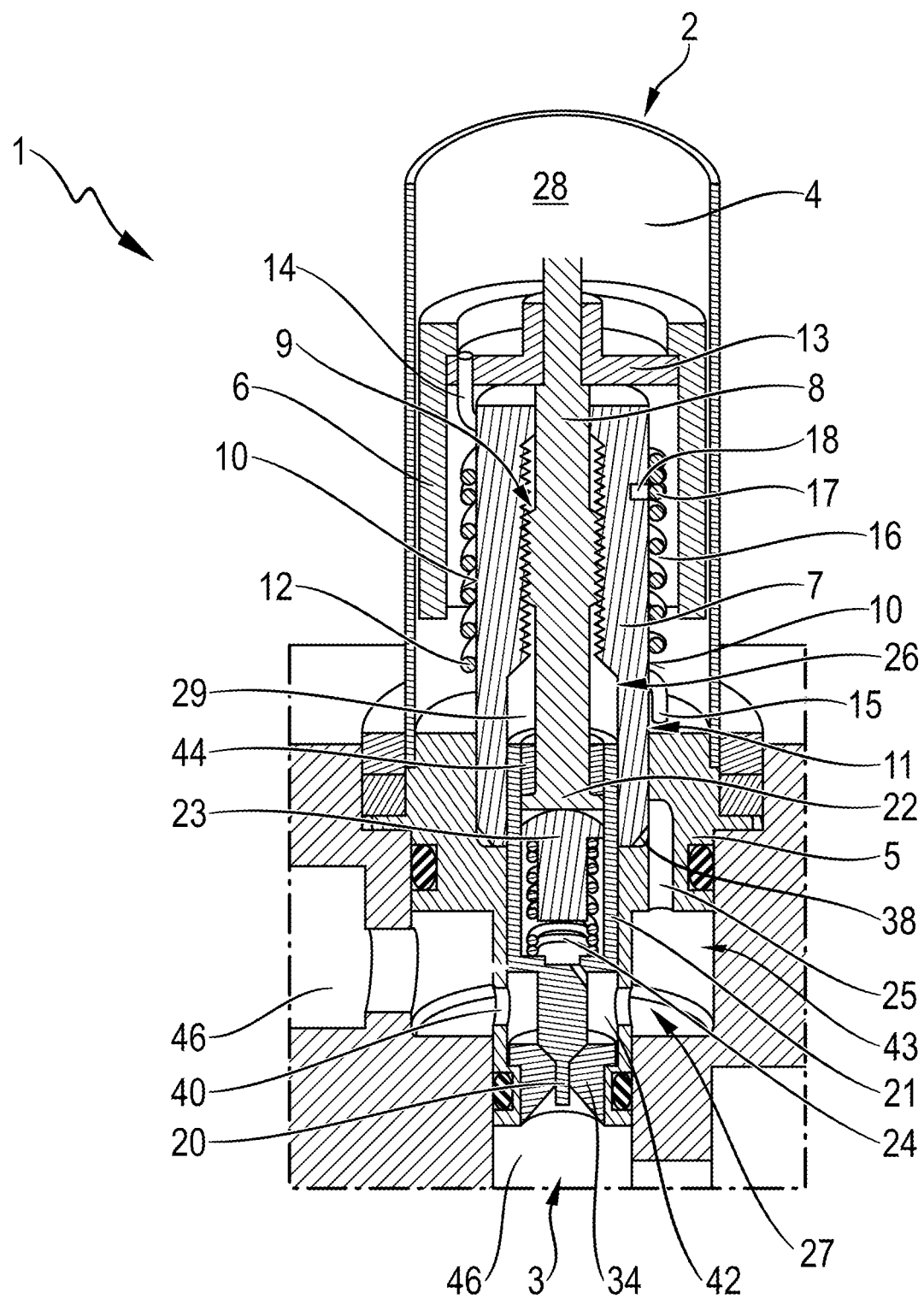
FIG. 1 illustrates a longitudinal sectional view of an expansion valve according to the invention in a condition installed in a valve installation space.

FIG. 1 illustrates a longitudinal sectional view of an embodiment of an expansion valve 1 according to the invention. For illustration purposes a top side 2 and a bottom side 3 is defined in FIG. 1. The top side 2 and the bottom side 3 are also respectively used for describing individual components shown in FIG. 1 in an overall arrangement.

The expansion valve 1 includes a valve base element 5 and a housing 4. FIG. 1 illustrates the expansion valve 1 in a condition where the expansion valve is installed in a valve installation cavity 43. The valve installation cavity 43 is a general cavity where the expansion valve is installed.

Since the valve base element 5 is an element that is integrally provided in one piece the element can be inserted into the valve installation cavity 43 as a cartridge. Accordingly, the entire expansion valve 1 is installable into and removable from the valve installation cavity in a simple manner.

A fluid channel 46 is configured in the expansion valve 1 that is installed in the valve installation cavity 43. The fluid channel 46 extends in FIG. 1 from a lateral portion on a left side of FIG. 1 in a direction towards the valve base element 5 and forms a fluid inlet cavity 27 about a lower portion of the valve base element 3, this means towards the bottom side 3.

The fluid inlet cavity 27 is connected through fluid bore holes 40 with a lower inner portion 42 of the valve base element 5. A valve needle 20 of the expansion valve 1 is also arranged in the lower inner portion 42.

When the expansion valve 1 is opened the fluid channel is formed from the lateral portion of the expansion valve through the fluid inlet cavity 27 through the fluid bore hole 40 through the lower interior portion 42 of the valve base element 5 and through a valve opening that is closeable by the valve needle 20 towards a portion below the expansion valve 1.

The housing 4 is arranged at an upper side, this means towards the top side 2 of the valve base element 5. In particular the housing 4 is configured sleeve shaped.

All functional elements or components of the expansion valve 1 are arranged within the housing 4 or within the valve base element 5. The housing 4 is enveloped by a stepper motor or a stator of a stepper motor.

The valve base element 5 closes the housing 4 at a bottom side 3. The housing 4 includes a rotor 6 of the stepper motor which imparts its rotation upon a center spool 8.

In FIG. 1 the rotation is transferred from the rotor 6 through an adapter element 13 to the center spool 8. The center spool 8 includes an external thread that s connected with an inner thread of a hollow shaft 7 forming a threaded connection 9.

The threaded connection 9 moves the center spool 8 axially downward along a rotation axis R, this means from the top side 2 to the bottom side 3 or upward, this means from the bottom side 3 to the top side 2. Therefore this movement mechanism transposes the rotating movement of the rotor 6 into an axial movement.

A spiral body 12 is configured about the hollow shaft 7. The spiral body 12 is configured as a support spring 12 in the embodiment illustrated in FIG. 1. Therefore, the same reference numeral 12 is used for the support spring and for the spiral body.

A stop element extends in the spiral body 12, this means in a thread turn 16. At this location the stop body is configured as a sliding ring 17.

The support spring 12 and the sliding ring 17 form a spool stopper geometry that predetermines an upper axial end position and a lower axial end position of the center spool 8. The function of the spool stopper structure is described in more detail with reference to FIG. 2 and FIG. 9.

The lower portion, this means the portion towards the bottom side 3 of he center spool 8 is received in a sleeve element 21. The sleeve element 21 itself is received in the valve base element 5. Additionally, also a lower portion of the hollow shaft 7 is received in the valve base element 5.

In particular the sleeve element 21 is partially received in the hollow shaft 7 as illustrated in FIG. 1, wherein the hollow shaft is in turn partially received in the valve base element 5. This means that an inner circumferential surface of the valve base element 5 is in contact with an outer circumferential surface of the hollow shaft 7. Furthermore, an inner circumferential surface of the hollow shaft 7 is in contact with an outer circumferential surface of the sleeve element 21.

The sleeve element 21 includes the valve needle 20 in a lower portion. The sleeve element 21 is an element that is integrally provided in one piece. This means the valve needle 20 is configured sleeve shaped.

The valve needle 20 is arranged in a valve seat 24, wherein an opening through the valve seat 34 is exposed by lifting the valve needle from the valve seat 34 towards the top side 2 so that a fluid can flow through the valve seat 34.

FIG. 1 shows the valve needle 20 in an applied condition where the valve needle presses onto the valve seat in a sealing manner.

Elements are arranged within the sleeve element 21 wherein the elements provide force transmission and torque limiting between the spool 8 and the sleeve element 21. These elements are described in more detail with reference to FIG. 10.

Figure 2:
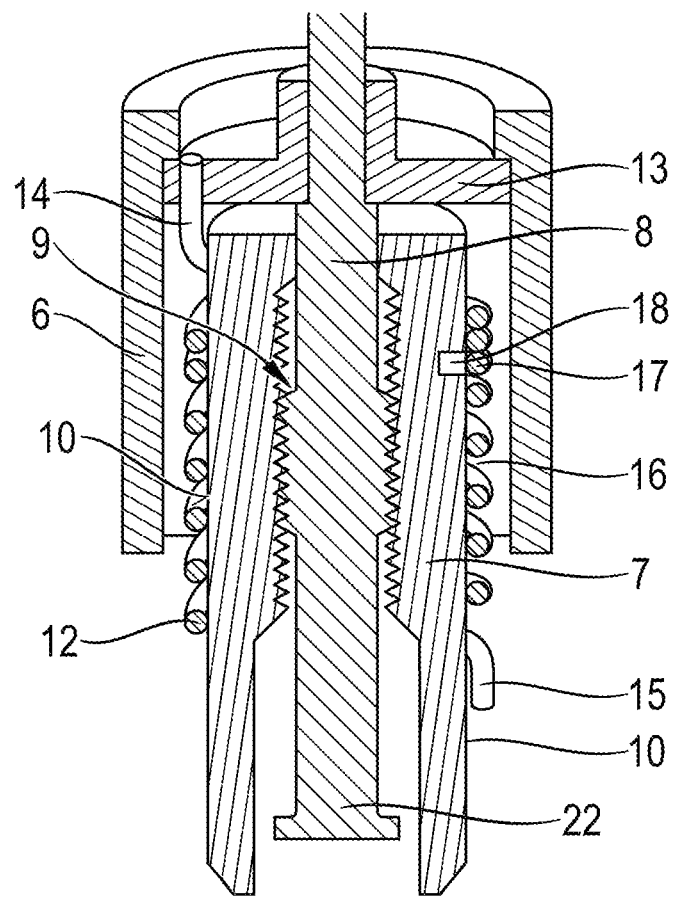
FIG. 2 illustrates a detailed longitudinal sectional view of a movement mechanism of the expansion valve according to the invention.

FIG. 2 illustrates an upper portion of the expansion valve 1 in more detail. In particular FIG. 2 shows the rotor 6 that is connected by the adapter 13 with the center spool 8 that is in turn connected through the threaded connection 9 with the hollow shaft 7.

Figure 5:
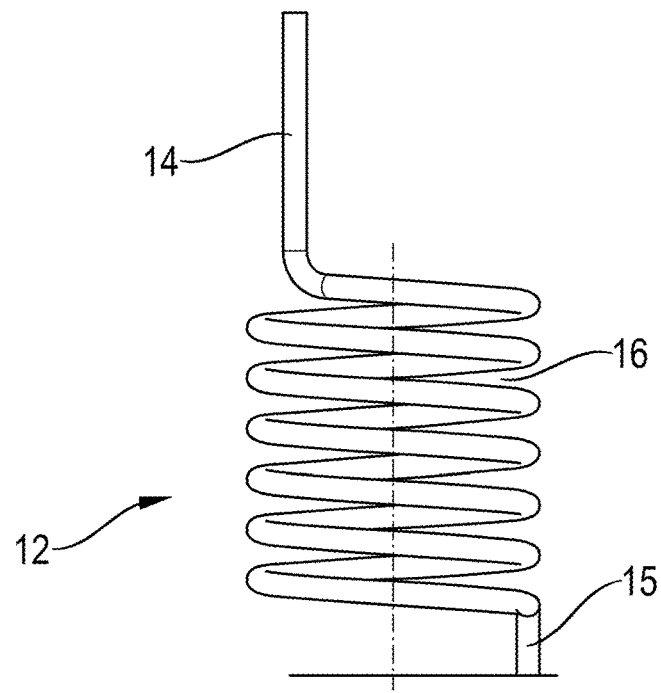
FIG. 5 illustrates a schematic view of a support spring of the expansion valve according to the invention.

As evident from FIG. 2 the support spring 12 is arranged at an enveloping surface 10 of the hollow shaft 7. In particular the support spring 12 is the coil spring that is illustrated in FIG. 5. The coil spring includes a first stop element 14 and a second stop element 15. The two stop elements 14, 15 are arranged at respective ends of the support spring 12 that is configured as a coil spring. In particular the first stop element 14 extends from an upper end of the coil spring axially upward, whereas the second stop element 15 extends axially downward from a lower end of the support spring 12.

As evident from FIG. 2 the first stop element 14 is connected with the adapter element 13. This means that the support spring 12 or the spiral body 12 can co-rotate with the adapter element 13. For this purpose the adapter element 13 includes off center openings 13*c* (cf. FIG. 3) in which the first stop element 14 can be inserted or is inserted.

As illustrated in FIG. 1 the second stop element 15 is oriented in a direction towards the valve base element 5. Advantageously the second stop element 15 can slip on the base element 5 during operations. Alternatively, a circular groove can be configured in the base element 5 wherein the second stop element 15 of the spiral body 12 or of the support spring 12 extends and runs in the circular groove.

Figure 3:
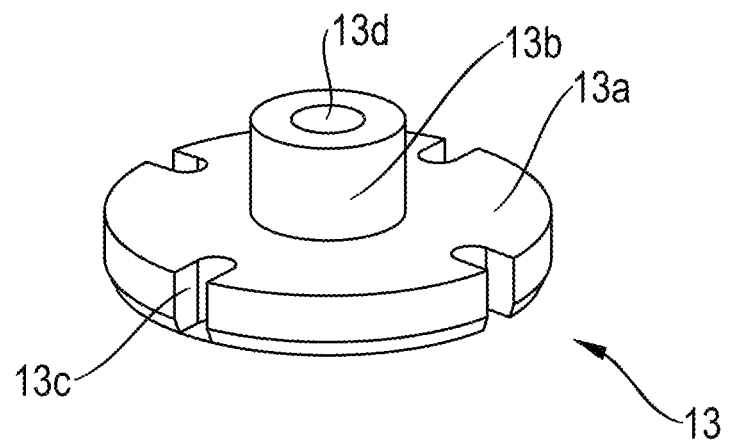
FIG. 3 illustrates a schematic view of an adapter element of the expansion valve according to the invention.

As illustrated in FIG. 3 the adapter element 13 includes a plate shaped base portion 13*a* and a receiving portion 13*b* for the center spool 8. Thus, the receiving portion 13*b* extends centrally from the plate shaped base portion 13*a* in an axial direction of the rotation axis R (cf. FIG. 4.).

The rotor 6, the adapter element 13, the spiral body 12 and the center spool 8 rotate about the rotation axis R.

The adapter element 13 includes plural off center openings 13*c* that are configured in the plate shaped base portion 13*a* off center, this means remote from the center. FIG. 3 illustrates four off center openings 13*c* configured as slotted holes at an outer circumference of the plate shape base portion 13*a*. Forming the off-center openings 13*c* as slotted holes provides in particular fabrication advantages.

The upper end portion, this means the first stop element 14 of the support spring 12 extends into one of the off-center openings 13*c*. The remaining off center openings 13*c* in the plate shaped base portion 13*a* of the adapter element 13 can be used e.g. to provide sufficient pressure balancing between a housing cavity 28 above the adapter element 13 and a housing cavity 28 below the adapter element 13.

A center pass through opening 13*d* is formed within the receiving portion 13*d* of the adapter element 13 wherein an upper portion of the center spool 8 is receivable in the central passthrough opening 13*d*. This upper portion of the spool 8 is configured complimentary to the central passthrough opening 13*d* viewed in cross section. Viewed in cross section in this context means both components are viewed along the rotation axis R.

For the purpose of force transmission, it is conceivable that both elements do not form a circular shape in cross section but a shape that is not rotation symmetrical. Thus, a simple force transmission can be performed from the adapter element 13 onto the center spool 8. Accordingly, the center passthrough opening 13*d* can be configured polygonal advantageously rectangular. Overall, however any non-rotation symmetrical configuration is conceivable to transfer the torque. Advantageously, however the cross section has a circular shape and the force transmission is provided e.g. by a weld.

Figure 4:
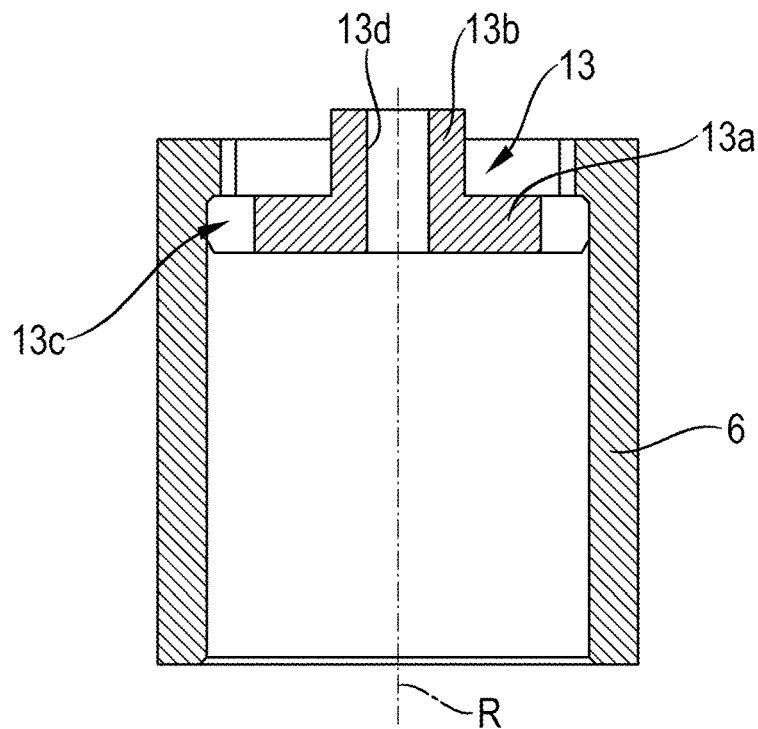
FIG. 4 illustrates a detailed longitudinal sectional view of an adapter element and a rotor of the expansion valve according to the invention.

As illustrated in FIG. 4 an outer circumference of the plate shaped base portion 13*a* is connected with the rotor 6. Thus, the torque of the rotor 6 is transmitted to the adapter element 13 as evident from FIGS. 4 and 2 an upper portion of the rotor 6 includes a stop so that the adapter element 13 cannot slip through the rotor 6. This is advantageous in particular during assembly and helps to avoid assembly errors.

The connection between rotor 6 and adapter element 13 can be bonded, form locking, or friction locking. In this context it is essential that a torque can be transferred from the rotor 6 upon the adapter element 13. As a matter of principle, it is also conceivable the adapter element 13 and the rotor 6 are configured as an integral one-piece component.

FIG. 2 illustrates the sliding ring 17 in a sectional view wherein the sliding ring 17 extends in the thread turn 16 of the support spring 12.

A larger representation of the sliding ring 17 is provided in FIGS. 6 and 7. This shows that the sliding ring 17 is configured as a spiral shaped element. In particular the sliding ring 17 is configured as a cylindrical spiral that is wound about the rotation axis R in installed condition.

As illustrated FIG. 6 the sliding ring 17 includes an upper end 17*a* and a lower end 17*b*. The upper end 17*a* and the lower end 17*b* can overlap so that a spiral shaped body with more than one winding is formed. This overlap of the ends and a number of windings of the support spring 12 limits a maximum number of revolutions of the center spool 8.

The sliding ring 17 includes a radially inward extending protrusion 18 at one end, in this embodiment at the lower end 17*b*. As evident from FIG. 1 this protrusion 18 extends in the hollow shaft 7. More precisely the protrusion 18 of the sliding ring 17 is insertable or inserted during operation into a longitudinal groove 11 of the hollow shaft 7. This longitudinal groove 11 is evident from FIGS. 8 and 9.

FIG. 8 illustrates a schematic representation of the hollow shaft 7. The hollow shaft 7 is configured as a hollow cylindrical element and envelops a hollow shaft cavity 29.

As evident from FIG. 8 a hollow shaft bore hole 31 is arranged at an upper portion of the hollow shaft 7, wherein the center spool 8 is insertable into the hollow shaft bore hole 31. The longitudinal grove 11 is arranged at the enveloping surface 10, wherein the longitudinal groove 11 extends in the axial direction in installed position parallel to the rotation axis R. The longitudinal groove 11 is advantageously open in downward direction, this means towards the bottom side 3. Alternatively, the longitudinal groove can also be limited in the upward direction and in the downward direction as illustrated in FIG. 9.

In installed condition the protrusion 18 of the sliding ring 17 is arranged in the longitudinal groove 11. Therefore, the sliding ring 17 cannot rotate relative to the hollow shaft 7. This means that the longitudinal groove 11 and the protrusion 18 provide a rotation safety of the sliding ring 17. The sliding ring 17 can only move axially upward along the longitudinal groove 11 and axially downward along the longitudinal groove 11.

When the rotor 6 rotates during operation and the adapter element 13 transfers this rotating movement upon the support spring 12 through the off center opening 13c the support ring 12 rotates relative to the hollow shaft 7 as well as relative to the sliding ring 17 that is axially secured in the hollow shaft 7, this means in the longitudinal groove 11. The rotation of the support spring 12 causes the sliding ring 1 to move in the thread turn 16 of the support spring 12. Accordingly, the sliding ring 17 moves up and down along the thread turn 16. It is evident the in particular from FIG. 9 that the spiral shaped sliding ring 17 extends in the thread turn 16 of the support spring 12.

The spool stopper geometry of the instant invention is formed by the sliding ring 17 only moving far enough upward along the thread turn 16 until the sliding ring 17 contacts the first stop element 14 of the support spring 12 with the upper end 17a of the sliding ring 17.

It is a function of the pitch of the support spring or the spiral body 12 whether the upper end position or the lower end position of the center spool 8 is defined. When the thread pitch of the spool 8 differs from the thread pitch of the spiral body 12 the first stop element 14 defines the upper end position of the center spool 8. When the spool 8 and the spiral body 12 have identical pitch orientations the first stop element 14 defines the lower end position of the center spool 8. Advantageously the thread pitch of the center spool 8 and the thread pitch of the central spiral body 12 are identical.

As soon as the sliding ring 17 contacts the first stop element 14 no further rotation of the support spring 12 relative to the sliding ring 17 is possible in this direction of rotation. More precisely the rotation of the adapter element 13 is slowed down in that the support spring 12 blocks, this means that the support spring 12 cannot rotate any further since it is blocked by the sliding ring 17.

The braking force is transferred from the longitudinal groove 11 of the hollow shaft 7 onto the protrusion 18 of the sliding ring 17 and from the protrusion 18 to an upper end 17a of the sliding ring 17 to the first stop element 14 of the support spring 12 and from the first stop element 14 to the off center opening 13c of the adapter element 13. A certain amount of rotation of the individual elements can certainly occur wherein the rotation leads to an attenuation of the braking force which can be desirable. This occurs in particular at the lower contact point.

FIG. 9 illustrates the sliding ring 17 at this lower contact point. As evident from FIG. 9 the support spring 12 has rotated far enough relative to the sliding ring 17 and the hollow shaft 7 so that the sliding ring 17 has moved to a lower end of the support spring 12. There the lower end 17b of the sliding ring 17 conies in contact with the second stop element 15 of the support spring 12. Thus, the brake force flow runs from the longitudinal groove 11 of the hollow shat 7 to the lower end 17b of the sliding ring 17 and from the lower end 17b of the sliding ring 17 to the lower second stop element 15 of the support spring 17. From this stop element 15 the brake force runs along the entire support spring 12 to the first stop element 14 and then again to the off center opening 13c of the adapter element 13.

This means that contrary to the upper contact point the brake force flows along the entire support spring 12. When the support spring 12 is configured as a rigid spiral body there is no attenuation or only a negligible attenuation of the braking force impacting the center spool 8.

Depending on the pitch of the spiral body the lower end position or the upper end position of the spool 8 is reached when the first stop element 14 contacts the upper end 17a of the sliding ring 17 and the upper or the lower end position of the spool 8 is reached when the second stop element 15 contacts the lower end 17b of the sliding ring 17 optionally plus a maximum torsion angle of the spiral body 12.

FIGS. 10-13 illustrate the force transmission mechanism from the spool 8 to the sleeve element 21 or the valve needle 20. The center spool 8 includes a plunger shaped end portion 22 that is configured at a lower end of the spool 8.

Figure 10:
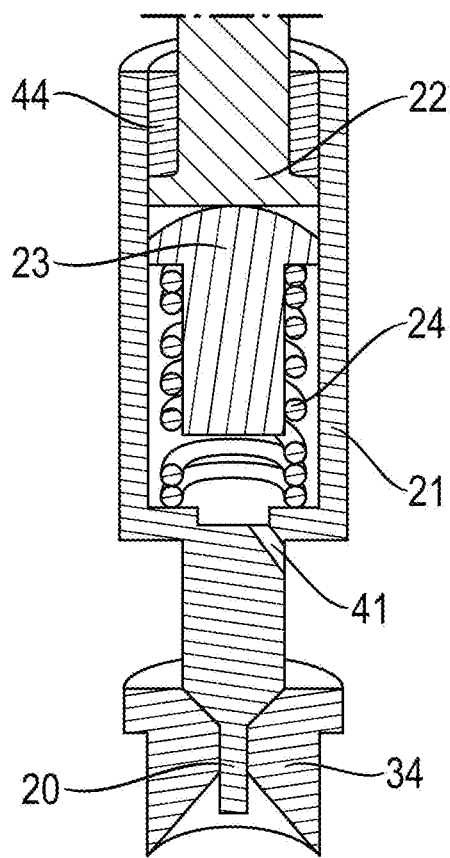
FIG. 10 illustrates a longitudinal sectional view of a force transmission and torque limiting device of the expansion valve according to the invention.
Figure 11:
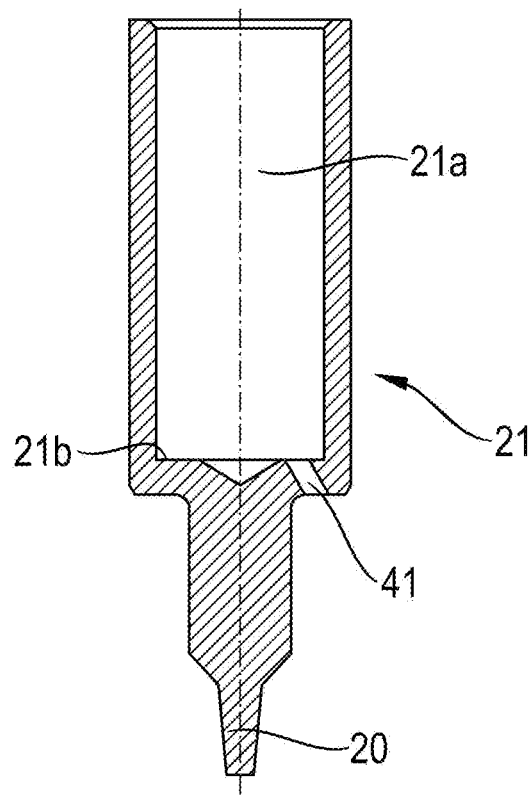
FIG. 11 illustrates a longitudinal sectional view of a sleeve element of the expansion valve according to the invention.

This plunger shaped end portion 22 is received in the sleeve element 21. More precisely the plunger shaped end portion is received in a receiving portion 21a of the sleeve element 21. As illustrated in FIG. 10 a compression spring 24 and a force transmission element 23 are arranged in the receiving portion 21a.

Figure 13:
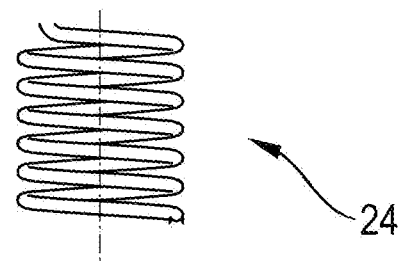
FIG. 13 illustrates a schematic representation of a compression spring of the expansion valve.

The compression spring 24 that is illustrated in an enlarged view in FIG. 13 is in contact with a sleeve base 21b of the sleeve element 21. The compression spring 24 is a cylindrical coil spring that contacts the sleeve base 21b of the sleeve element 21 with a lower portion.

Figure 12:
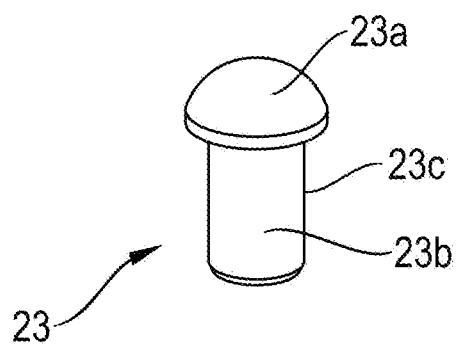
FIG. 12 illustrates a schematic view of a force transmission element of he expansion valve according to the invention.

As illustrated in FIG. 12 the force transmission element 23 includes a head portion 23a and a shaft portion. The shaft portion 23b in turn includes an enveloping surface 23c.

The shaft portion 23b is arrangeable within the compression spring 24. Put differently the compression spring is supported in an inward direction by the enveloping surface 23c of the shaft portion 23b. The force transmission element 23 thus functions as a support element for the compression spring 24, wherein a kinking of the compression spring 24 is also prevented by the inner circumferential surface of the receiving portion 21a. Overall the compression spring 24 is supported by the receiving portion 21a and the receiving portion 21b.

As evident from FIG. 12 the force transmission element 23 has a mushroom shape overall, this means that the head portion 23a is configured e.g. semi-spherical and includes an outer circumference that is larger than the outer circumference of the shaft portion 23b. Put differently the head portion 23a is configured mushroom head shaped and the shaft portion 23b is configured mushroom stem shaped.

Since the head portion 23a is wider a contact portion is formed between the force transmission element 23 and the compression spring 24. This means that an upper portion of the compression spring 24 can come in contact with a lower portion of the head portion 23a.

The mushroom head shape of the head portion 23a furthermore has the advantage that the contact portion to the mushroom shaped end portion 22 is essentially punctiform. An axial force can be transferred through this punctiform contact portion, this means from a top (2) to a bottom (3) or from the bottom (3) to the top (2) quite well, whereas torque is transferred hardly at all. Thus, no substantial torque is transferred by the plunger shaped end portion 22 to the force transmission element 23. Therefore, the force transmission element 23 can function as a torque limiter.

When a rotating movement is transferred from the rotor 6 through the adapter element 13 onto the center spool 8, the plunger shaped end portion 22 moves upward or downward. When the plunger shaped end portion 22 moves downward it presses against the force transmission element 23 which presses onto the sleeve base 21b with attenuation by the compression spring 24 and thus presses onto the sleeve element 21 and the valve needle 20. This means that the valve needle 20 is pressed in a direction towards the valve seat 24.

An upper portion towards the top side (2) of the sleeve element 21 is closed by a bushing 24. The bushing 24 is configured hollow cylindrical and made from a different material than the spool 8. In particular, the first material from which the spool 8 is made is harder than the second material from which the bushing 44 is made. Thus, low friction between the spool 8, thus the plunger shaped end portion 22 and the bushing 44 can be achieved. This is advantageous and prevents that the valve needle 24 co-rotates with the valve seat 34 for any length of time.

This means furthermore that controlled wear occurs at the second material that has lower hardness when friction occurs between the first material and the second material. This helps to control wear at the force transmission arrangement or of the associated components.

The bushing 44, the sleeve element 21 with the valve needle 20 and the force transmission element 23 rotate at the same speed as the spool 8 until the valve needle 20 is restricted with respect to its axial movement in the valve seat 34 and the effective torque is less than between the bushing 44 and the spool 22 in their contact area.

Only when the braked static friction torque in the valve seat 34 is large enough, the valve needle 20 is caused to stop. From then on there is no relative movement between the spool 22 and the bushing 44. The relative movement occurs at the face of the bushing 44 and then only partially at the inner enveloping surface of the bushing 44.

The main reason of the residual rotation of the spool 8 after the valve needle 20 sits in the valve seat 34 is to provide reliable closing even after a longer run time. Thus, a reliable closing of the valve is also assured after years of wear. Therefore, the spool performs a residual rotation of several steps, e.g. 10 steps. This residual rotation requires reliable torque de-coupling.

The advantage of using the bushing 44 lies in particular in that controlled wear occurs with low friction relative to the spool 8. Therefore, neither the sleeve element 21 nor the center spool 8 wear out. Since the force transmission portion between the force transmission element 23 and the center spool 8 is kept at minimum through the particular shape of the head portion 23a no particularly high friction occurs at this location so that the force transmission element 23 can also be fabricated from the first material.

The first material can be e.g. stainless steel and the second material is e.g. a copper alloy, advantageously bronze. The material pairing of bronze and stainless steel is particularly advantageous. Since the sleeve element 44 is rather long in its longitudinal direction, this means along the rotation axis R, a sufficient amount of material is provided that can be removed from the sleeve element. Particularly advantageously the second material is sintered bronze.

Figure 14:
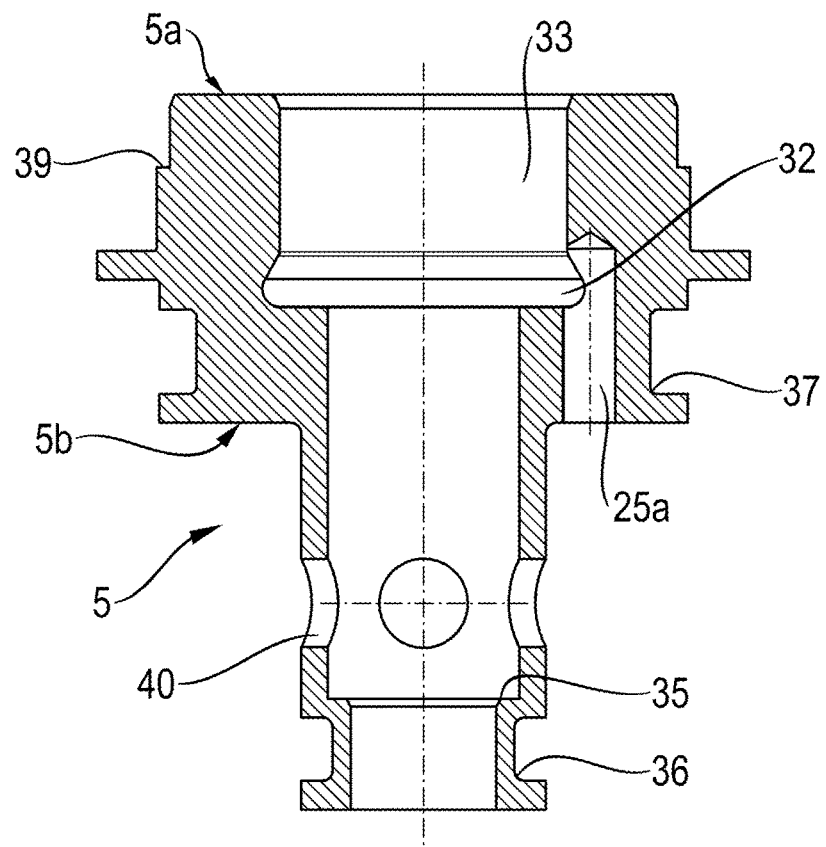
FIG. 14 illustrates a longitudinal sectional view of a valve base element of the expansion valve according to the invention.

FIG. 14 illustrates a longitudinal sectional view of the valve base element 5. The valve base element 5 includes a side 5a that is oriented towards the housing 4, wherein the side 5a is an upper side towards the top side 2 of the valve base element 5. The valve base element 5 includes a side 5b that is oriented away from the housing 4 opposite to the side 5a that is oriented towards the housing 4.

As evident in FIG. 1, the fluid inlet cavity is configured adjacent to the side 5b of the valve base element 5 that is oriented away from the housing 4 when the valve base element 5 is installed into the valve installation space 43.

The valve base element 5 further includes a receiving portion 33 in which the hollow shaft 7 is received that receives the sleeve element 21 inside the hollow shaft 7 in assembled condition as illustrated in FIG. 1.

A circumferential relief groove 32 is arranged in a lower portion of the receiving portion.

A valve seat receiving portion 35 is arranged further down in the valve base element 5. This valve seat receiving portion 35 provides a stop for the valve seat 34 when the valve seat 34 is pushed into the valve base element 5 from above. This achieves a secure and defined arrangement of the valve seat 34.

A lower seal receiving portion 36 is configured at an outer lower portion of the valve base element 5. As evident from FIG. 1 an annular seal element can be inserted into the seal receiving portion in assembled condition. The seal element seals the fluid inlet cavity 27 against a portion of the fluid channel 46 that is arranged below the expansion valve 1 and vice versa.

FIG. 14 shows an upper seal receiving portion 37 configured in a center to upper portion of the valve base element 5. As evident from FIG. 1 the upper seal receiving portion 37 also includes an annular seal element in the installed condition wherein the annular seal element seals in particular the fluid inlet cavity 27 against ambient.

Figure 15:
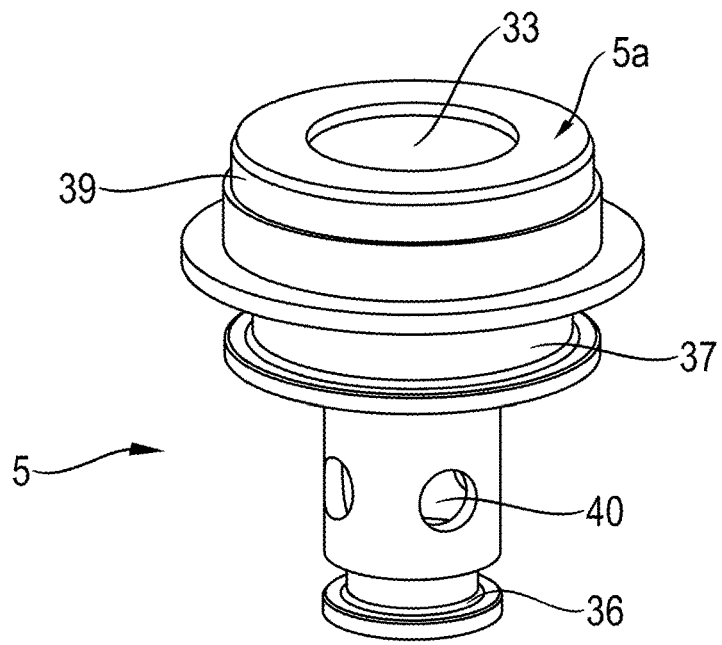
FIG. 15 illustrates a schematic view of the valve base element of FIG. 14.
Figure 16:
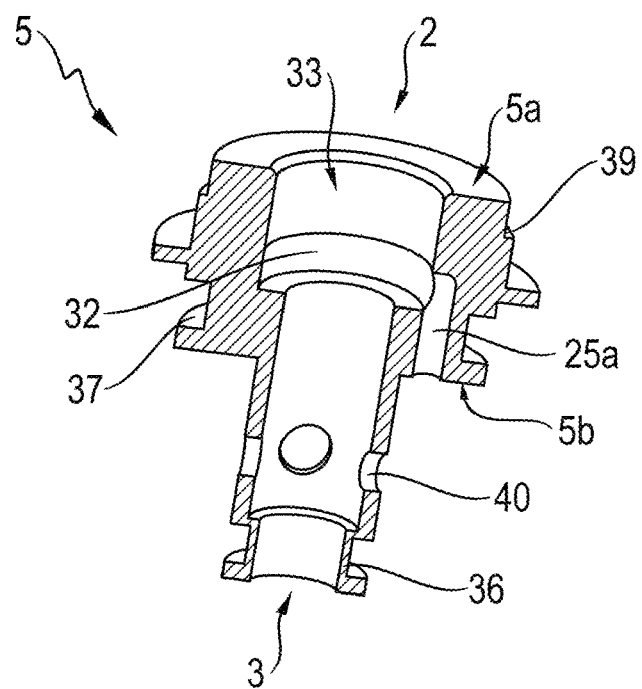
FIG. 16 illustrates a detailed longitudinal sectional view of the valve base element according to the invention.

As also evident from FIGS. 14-16 a housing seat 39 is arranged at a topside 2 of the valve base element 5. The housing seat is in particular arranged in a radially circumferential manner at the upper portion of the valve base element 5 that is oriented towards the housing 4 so that the housing seat 39 can receive and close the housing 4. As illustrated in FIG. 1 a closing element e.g. provided as a ring can press the housing 4 radially inward against the housing seat 39.

A plurality of pressure balancing channels 35, 36 and 41 is configured within the expansion valve 1. A first pressure balancing channel 25 connects the housing cavity 28 with the fluid inlet cavity 27 and balances the pressure between both cavities.

The first pressure balancing channel 25 includes a first channel portion 25a and a second channel portion 25b. The first channel portion 25a is configured within the valve base element 5 as illustrated in FIGS. 14 and 16. Overall the first channel portion 25a is a bore hole that extends from a side 5b that is oriented away from the housing 4 into the valve base element 5. The first channel portion 25a is formed up to the circumferential relief groove 32 of the valve base element 5. This means that the bore hole extends into the relief groove 32. Thus, the first channel portion 25a provides a connection from the side 5b that is oriented away from the housing 4 to the receiving portion 33 of the base element 5.

Figure 17:
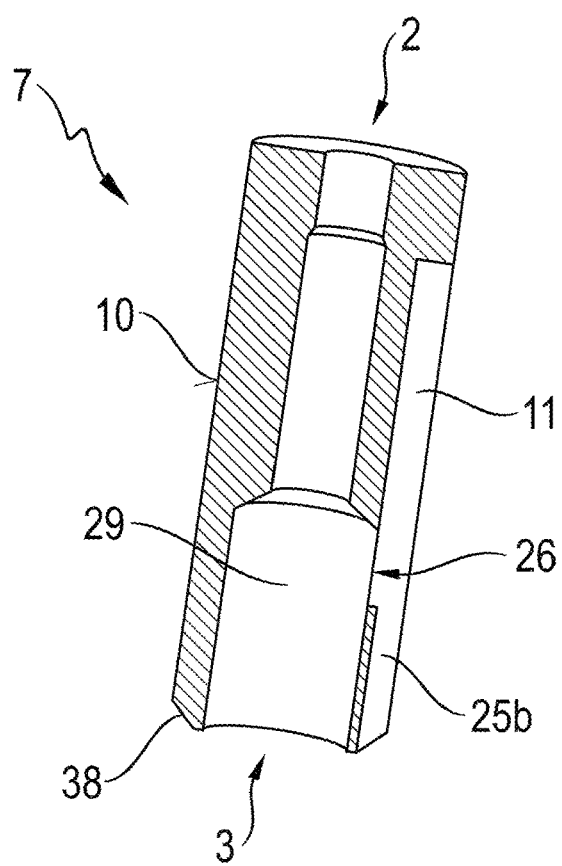
FIG. 17 illustrates a detailed longitudinal sectional view of a hollow shaft of the expansion valve according to the invention.

In an assembled condition of expansion valve 1 the hollow shaft 7 illustrated in FIG. 17 is received in this receiving portion 33. The hollow shaft 7 includes the second channel portion 25b that extends as a longitudinal groove 11 from a lower end of the hollow shaft 7 in an upward direction.

Advantageously the lower end 7 of the hollow shaft is configured as a circumferential bevel 38 so that the circumferential bevel 38 as well as the circumferential relief groove 32 function as a connection portion between the first channel portion 25a and the second channel portion 25b.

In general, a circumferential connection portion has in particular an advantage in that no alignment has to be performed between the hollow shaft 7 and the valve base element 5. As a matter of principle, however, it would already suffice to arrange either of the circumferential relief groove or the circumferential bevel 38. Forming both elements, however, leads to a quicker pressure balancing.

Therefore the longitudinal groove 11 of the hollow shaft 7 serves a double function. Thus, the longitudinal groove is used on the one hand side to support the sliding ring 17 and on the other hand side it forms the second channel portion 25b that provides pressure balancing. This functions in particular in that the longitudinal groove 11 is open towards the inner housing cavity 28. Therefore, pressure balancing is provided between the fluid inlet cavity 27 and the inner housing cavity 28.

A second pressure balancing channel 26 provides pressure balancing between the hollow shaft cavity 29 and the housing cavity 28. This second pressure balancing channel 26 is evident in particular from FIG. 17. This FIG. shows in particular that the second pressure balancing channel 26 is formed in a portion of a maximum radial extension of the longitudinal groove 11 and the hollow shaft cavity 29. This has in particular an advantage in that the second pressure balancing channel 26 can be produced simultaneously with introducing the longitudinal groove 11 into the hollow shaft 7 with the hollow shaft cavity 29 without requiring an additional process step.

In principle the second balancing channel 26 is an opening at a base of the longitudinal groove 11. This opening is connected with the hollow shaft interior 29 and the longitudinal groove 11 and therefore also with the housing cavity 28. Furthermore, the second pressure balancing channel 26 is formed in portions by the second channel portion 25b of the first pressure balancing channel 25 or the pressure balancing channels use common portions.

The expansion valve 1 further includes a third balancing channel 41. This third pressure balancing channel 41 is evident in particular from FIG. 10 and connects the lower inner portion 42 of the valve base element 35 with the receiving portion 21a of the sleeve element 21. The lower inner portion 42 of the valve base element 5 is connected through the fluid bore holes 40 with the fluid inlet cavity 27 as evident from FIG. 1.

All features described and shown in conjunction with individual embodiments according to the invention can also be used in different combinations to implement the invention and cause its advantageous effects. The protective scope of the instant invention is defined by the appendant patent claims and is not limited by the features described in the description or shown in the drawing figures.

The description describes many individual aspects of the expansion valve 1. Individual aspects can also be claimed by themselves separate from other aspects.

What is claimed is:

1. An expansion valve operable by a stepper motor, the expansion valve comprising:
    a housing;
    a hollow shaft arranged in the housing;
    a valve base that supports the hollow shaft and closes the housing;
    a rotor drivable by a stator of the stepper motor;
    a center spool arranged in the hollow shaft and drivable by the rotor so that a rotation of the center spool is transferrable by a threaded connection into an axial movement of the center spool that opens or closes the expansion valve; and
    a sleeve that includes a receiving portion that includes at least portions of the center spool, of a compression spring and of a force transmission element respectively and a valve needle,
    wherein the receiving portion of the sleeve is closed by a bushing,
    wherein the center spool is made from a first material and the bushing is at least partially made from a second material that differs from the first material,
    wherein the second material has a lower hardness than the first material, and
    wherein the second material is a sinter material,
    wherein the center spool includes a plunger shaped end portion integrally provided in one piece with the center spool and configured and arranged so that the plunger shaped end portion contacts a center of a cambered closed surface of the force transmission element directly and punctiform so that an axial force is transferable directly from the center spool to the force transmission element,
    wherein the plunger shaped end portion of the center spool does not extend axially into the force transmission element or the compression spring,
    wherein an upper portion of the plunger shaped end portion comes into frictional axial contact with the bushing, and
    wherein the compression spring is in direct axial contact with the sleeve.

2. The expansion valve according to claim 1, wherein the bushing oil infused.

3. The expansion valve according to claim 2, wherein at least 15% by volume of the bushing include the oil.

4. The expansion valve according to claim 1, wherein the first and the second material are metals or metal alloys.

5. The expansion valve according to claim 4,
    wherein the second material is a copper alloy or bronze, and
    wherein the first material is steel or stainless steel.

6. The expansion valve according to claim 1, the second material is sinter bronze.

7. The expansion valve according to claim 6, wherein the sinter bronze has the following chemical composition: 5%-18% or tin, 0-3% graphite and a rest copper.

8. The expansion valve according to claim 1, wherein a portion of the compression spring is arranged on an enveloping surface of the shaft portion of the force transmission element.

9. The expansion valve according to claim 8, wherein the compression spring is a cylindrical coil spring.

10. The expansion valve according to claims 1, wherein the shaft portion is sized in an axial direction so that exceeding an axial force that compresses the compression spring by a predefined spring travel brings the shaft portion in axial contact with a sleeve base of the sleeve.

11. The expansion valve according to claim 1, wherein the receiving portion receives an entirety of the bushing, the plunger shaped end portion, the compression spring and the force transmission element.

12. The expansion valve accarding to claim 1, further comprising:
   a valve seat,
   wherein the valve base is integrally provided in one piece and receives at least portions of the valve seat, the sleeve element and the hollow shaft respectively.

13. The expansion valve according to claim 12,
   wherein the valve base includes a valve seat receiving portion in a lower portion of the valve base and a receiving portion in an upper portion of the valve base, and
   wherein the receiving portion is configured to receive the hollow shaft and the sleeve.

14. The expansion valveaccording to claim 13, wherein the sleeve and the receiving portion is at least partially arranged within the hollow shaft.

15. The expansion valve according to claim 1,
   wherein the center spool, the bushing, the sleeve element the force transmission element, the compression spring and the valve needle rotate at identical speed when the upper portion of the plunger shaped end portion is in frictonal axial contact with the bushing,
   wherein the force transmission element is configured so that it absorbs only a limited amount of torque from the center spool when the plunger shaped end portion of the center spool is not in axial contact with the bushing so that the center spool and the valve needle rotate at identical speed until an axial movement of the valve needle is restricted by the needle valve seat.

16. The expan ion valve according to claim 1, further comprising: a spool stopper structure that limits the rotation of the center spool between an upper axial end position and a lower axial end position of the spool.

17. The expansion valve according to claim 16, wherein the spool stopper structure is formed by a cooperation of a spiral body and a stop body.

* * * * *